United States Patent
Le et al.

(10) Patent No.: US 10,949,599 B2
(45) Date of Patent: *Mar. 16, 2021

(54) OVERCOMING RETIMING LIMITATIONS DUE TO INITIAL CONDITIONS CONFLICTS

(71) Applicant: ALTERA CORPORATION, San Jose, CA (US)

(72) Inventors: Dai Le, Toronto (CA); Scott James Brissenden, Toronto (CA)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/370,070

(22) Filed: Mar. 29, 2019

(65) Prior Publication Data

US 2019/0228128 A1   Jul. 25, 2019

Related U.S. Application Data

(63) Continuation of application No. 15/213,145, filed on Jul. 18, 2016, now Pat. No. 10,282,508.

(51) Int. Cl.
*G06F 17/50* (2006.01)
*G06F 30/398* (2020.01)
*G06F 30/3312* (2020.01)
*G06F 119/12* (2020.01)

(52) U.S. Cl.
CPC ........ *G06F 30/398* (2020.01); *G06F 30/3312* (2020.01); *G06F 2119/12* (2020.01)

(58) Field of Classification Search
CPC . G06F 30/398; G06F 30/3312; G06F 2119/12
See application file for complete search history.

(56) References Cited

U.S. PATENT DOCUMENTS

| | | | |
|---|---|---|---|
| 7,120,883 | B1 | 10/2006 | van Antwerpen et al. |
| 7,360,190 | B1 | 4/2008 | Singh et al. |
| 7,739,642 | B2 | 6/2010 | Albrecht |
| 7,945,880 | B1 | 5/2011 | Albrecht et al. |
| 8,918,748 | B1 | 12/2014 | Chiu et al. |
| 9,251,876 | B1 * | 2/2016 | Gamsa ............... G06F 30/34 |
| 9,529,952 | B1 * | 12/2016 | Gamsa ............... G06F 30/33 |
| 10,282,508 | B1 * | 5/2019 | Le ................. G06F 30/3312 |
| 10,339,244 | B1 * | 7/2019 | Gamsa ............. G06F 30/327 |
| 2018/0137226 | A1 * | 5/2018 | Iyer ................. G06F 30/327 |

* cited by examiner

*Primary Examiner* — Nghia M Doan

(74) *Attorney, Agent, or Firm* — Fletcher Yoder, P.C.

(57) ABSTRACT

In one embodiment, a computer-implemented method includes performing retiming using a first circuit design to determine one or more variations to the first circuit design, identifying one or more source registers that are involved in one or more unsuccessful retiming moves due to initial conditions conflicts, and recommending, via a graphical user interface, one or more corrective actions to the one or more source registers to avoid the initial conditions conflicts and improve performance of the one or more variations.

20 Claims, 7 Drawing Sheets

```
▽ Changed power-up state for 197 Registers to "DON'T CARE" (1 domain)
  ▽ Changed power-up state for 197 Registers to "DON'T CARE" in Clock Domain 'clk' (1 Entry)
    ▽ Changed power-up state for 197 Registers to "DON'T CARE" in Entity test (1 Instance)
      ▽ Changed power-up state for 197 Registers to "DON'T CARE" in Instance test
        ▽ Changed power-up state for bus a_r (197 signals) to "don't care"
            Changed power-up state for a_r[50] to "DON'T CARE"
            Changed power-up state for a_r[51] to "DON'T CARE"
            Changed power-up state for a_r[52] to "DON'T CARE"
            Changed power-up state for a_r[53] to "DON'T CARE"
            Changed power-up state for a_r[54] to "DON'T CARE"
            Changed power-up state for a_r[55] to "DON'T CARE"
            Changed power-up state for a_r[56] to "DON'T CARE"
            Changed power-up state for a_r[57] to "DON'T CARE"
            Changed power-up state for a_r[58] to "DON'T CARE"
            Changed power-up state for a_r[59] to "DON'T CARE"
            Changed power-up state for a_r[60] to "DON'T CARE"
            Changed power-up state for a_r[61] to "DON'T CARE"
            Changed power-up state for a_r[62] to "DON'T CARE"
            Changed power-up state for a_r[63] to "DON'T CARE"
            Changed power-up state for a_r[64] to "DON'T CARE"
            Changed power-up state for a_r[65] to "DON'T CARE"
            Changed power-up state for a_r[66] to "DON'T CARE"
            Changed power-up state for a_r[67] to "DON'T CARE"
            Changed power-up state for a_r[68] to "DON'T CARE"
            Changed power-up state for a_r[69] to "DON'T CARE"
```

*FIG. 18*

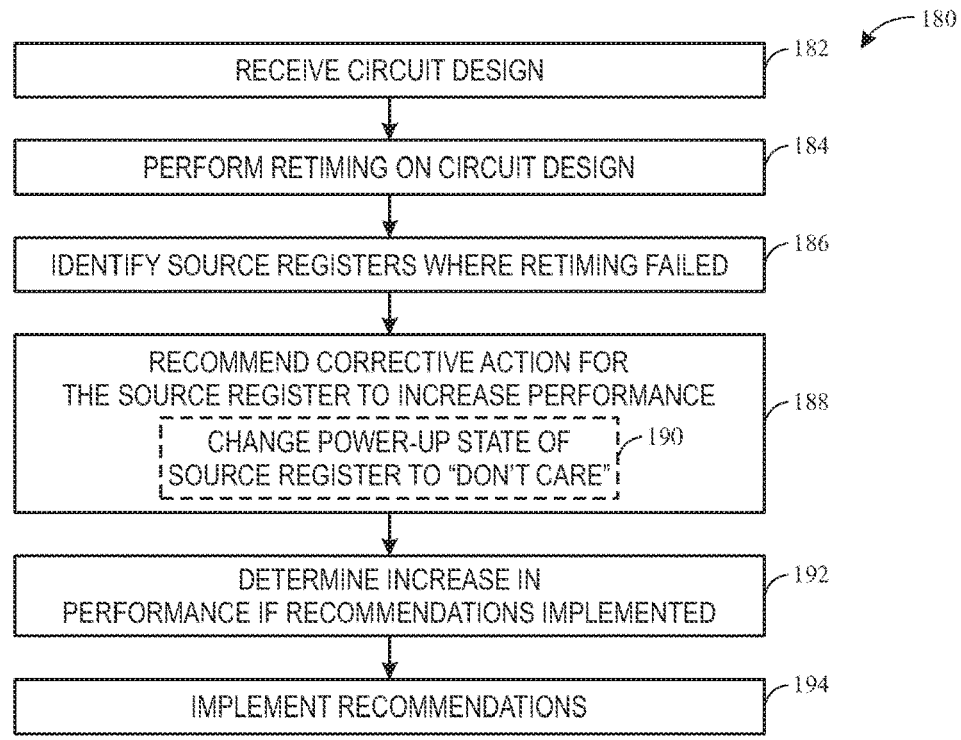

*FIG. 19*

OVERCOMING RETIMING LIMITATIONS DUE TO INITIAL CONDITIONS CONFLICTS

CROSS-REFERENCE TO RELATED APPLICATIONS

Under 35 U.S.C. § 120, this application is a continuation of U.S. patent application Ser. No. 15/213,145, entitled "Overcoming Retiming Limitations due to Initial Conditions Conflicts," filed on Jul. 18, 2016, which is incorporated by reference herein in its entirety for all purposes.

BACKGROUND

The present disclosure relates generally to integrated circuits (ICs), which may include programmable logic devices (PLDs) such as field programmable gate arrays (FPGAs). More particularly, the present disclosure relates to overcoming retiming limitations due to initial conditions conflicts in circuit designs for an integrated circuit.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Integrated circuits (ICs) take a variety of forms. For instance, programmable logic devices (PLDs) such as field programmable gate arrays (FPGAs) are ICs that may be highly flexible devices. FPGAs include logic that may be programmed after manufacturing to provide functionality that the FPGA may be designed to support. Thus, FPGAs contain programmable logic, or combinational logic blocks, that may perform a variety of functions on the FPGAs, according to a circuit design of a user. In a programmable logic circuit design, groups of combinational logic elements may be separated by registers. At each clock cycle, a data signal may exit one register, be processed through a first group of combinational logic elements, and enter another register to wait for the next clock cycle to begin. At the next clock cycle, the data signal may continue through a second group of combinational logic elements into a third register, and so forth. Thus, the way that the registers separate different groups of combinational logic elements may have a substantial impact on the maximum achievable clock signal frequency by which the data signal may pass through the programmable logic circuit design. The maximum clock signal frequency may depend on how quickly the data signal can pass through a group of combinational logic elements between any two registers of the circuit design. One technique to improve the performance of the circuit design is through register retiming, which involves adjusting the placement of the registers back and forth across different groups of combinational logic to improve the maximum achievable clock signal frequency.

However, the benefits of retiming are often limited due to the use of certain constructs in circuit designs that inadvertently inhibit retiming. Such restrictions might include user directives intended for other purposes but that also limit retiming; the use of certain hardware features, such as asynchronous clears, that might be incompatible with retiming on some architectures; or even simply the lack of sufficient available registers for retiming. Even if some computer aided design (CAD) tools were able to remove these restrictions or add registers to demonstrate the performance potential of retiming with changes to the user's circuit design, this may involve computing new power-up states for retimed registers to ensure functional equivalence with the initial circuit design.

Some CAD tools that perform retiming preserve the functionality of the circuit (before and after retiming) over the range of inputs that will occur during operation of the initial circuit design. For this reason, the retiming tools generally try to fully preserve the power up behavior of an initial circuit design when performing retiming. This can be done by computing initial power up conditions for any individually retimed registers. In practice, it is not always possible to compute new register initial conditions that guarantee identical circuit performance. For example, there may be one or more conflicts with the initial conditions. This limitation will result in rejected retiming moves, and an overall reduction in the benefits of automatic retiming. Further, the user may be unaware of which registers were involved in the one or more conflicts and/or an expected performance improvement that could be achieved if the one or more conflicts were addressed.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to software programs, methods, and devices for computing which source registers in a circuit design of a user are involved in a failed retiming move involving one or more conflicts, such as initial conditions conflicts. In particular, some embodiments may include determining, displaying, and/or controlling specific recommended corrective actions that describe how the user may modify their circuit design to avoid the identified specific retiming initial condition conflicts limiting the performance of their circuit design. The embodiments may provide a graphical user interface (GUI) that displays the source registers involved in the initial condition conflicts, as well as the recommended actions to perform on the identified source registers to address the issues. Additionally, some embodiments may include an automated workflow that computes expected performance improvements that could be achieved if the initial condition conflicts are addressed.

Various refinements of the features noted above may be employed in relation to various aspects of the present disclosure. Further features may also be incorporated in these various aspects as well. These refinements and additional features may be employed individually or in any combination. For instance, various features discussed below in relation to one or more of the illustrated embodiments may be incorporated into any of the above-described aspects of the present invention alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 18 illustrates a graphical user interface (GUI) screenshot for recommended actions to overcome identified initial condition conflicts during retiming, in accordance with an embodiment; and FIG. 19 illustrates a flow diagram of a process suitable for recommending corrective actions for source registers involved in a failed retiming move and determining a performance improvement associated with implementing the recommendations, in accordance with an embodiment.

DETAILED DESCRIPTION OF SPECIFIC EMBODIMENTS

Figure 1:
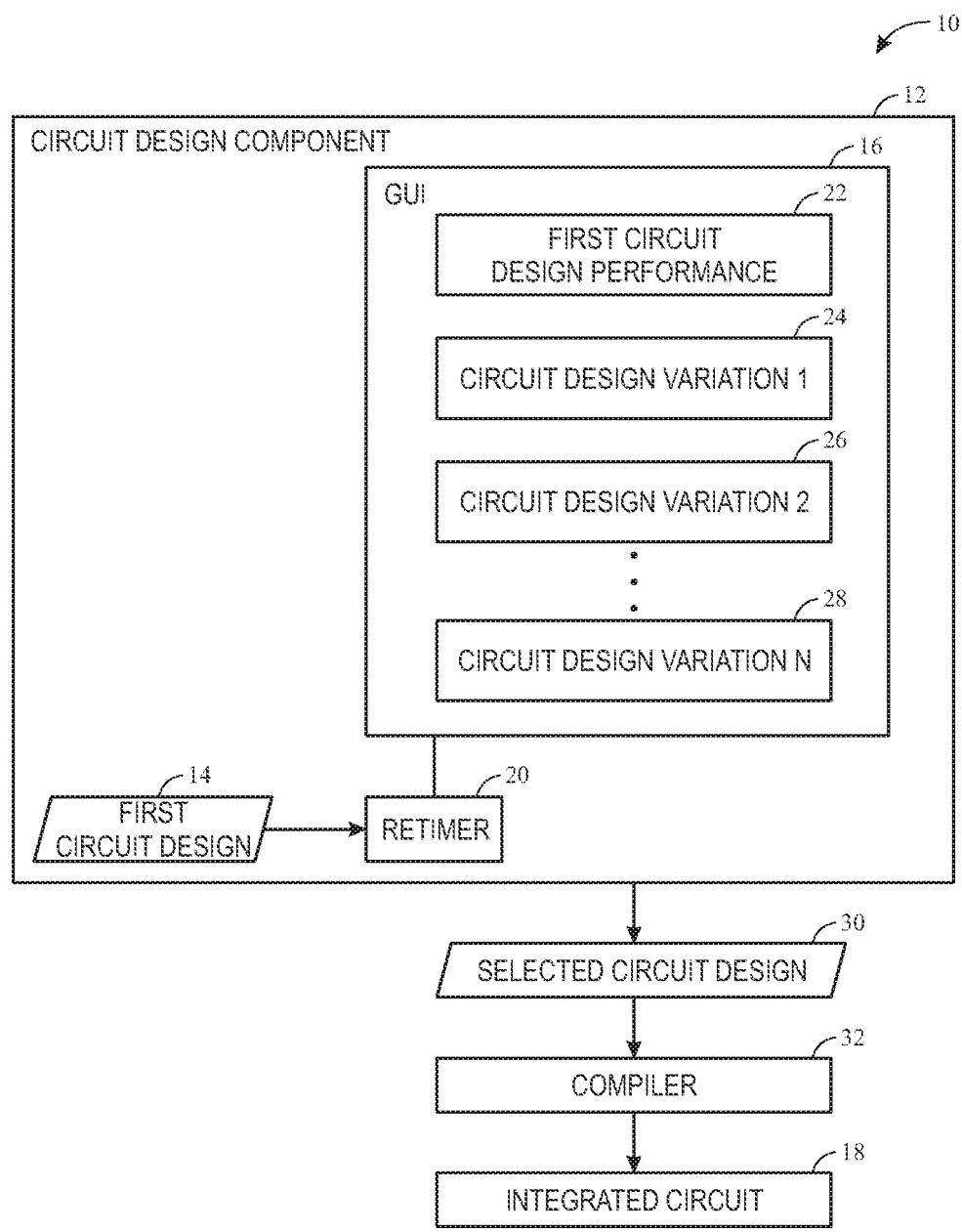
FIG. 1 illustrates a block diagram of a system that utilizes a circuit design component that determines variations of a first circuit design and uses a graphical user interface (GUI) to display the variations, any associated conflicts, and/or recommendations to address the conflicts, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A retimer may generate one or more variations to an initial circuit design by structurally repositioning registers (e.g., flip-flops) across combinational elements to improve performance. As may be appreciated, the overall performance of the clock signal is dictated by combinational elements between the registers and/or input-outputs (IOs) that have the longest delay. A critical path typically refers to the combinational elements, registers, and/or IOs that are included in the path in the circuit with the longest delay. Thus, one goal of retiming is reducing the longest delay of the critical path by rearranging registers across the combinational elements to balance delays for various paths in the circuit design.

The retimer may also compute new initial states (e.g., power-up) for all registers in the retimed circuit using the initial states of the initial circuit design and Boolean function of the combinational elements to ensure functional equivalence of the variations and the initial circuit design. Thus, retiming may refer to a technique that enables the clock signal to run faster while still preserving correctness of the circuit design. However, it may not always be possible for the retimer to compute the initial states after a retiming move. For example, initial conditions (e.g., initial output states) of the circuit may limit certain retiming moves, such as moving registers backwards or forwards past combinational elements, as described in more detail below.

Accordingly, some embodiments of the present disclosure relate generally to circuitry and/or processor-executable, machine-readable instructions stored on a tangible, non-transitory, machine-readable medium for enabling determining, recommending, and/or implementing corrective actions to address retiming limitations due to initial conditions (e.g., initial output states) in a retimed circuit design. In some embodiments, an initial conditions conflict may refer to an initial output state of a varied circuit design differing from an initial output state of a first circuit design. Example corrective actions may include changing the reset strategies (e.g., set value to "don't care" and/or enable individual registers to be agnostic to any power-up state) of the set of source registers involved in failed retiming moves due to an initial conditions conflict to improve performance. In some embodiments, a graphical user interface (GUI) is used to display variations of an initial circuit design including the source registers involved in the failed retiming moves with the initial conditions conflicts and specific recommended corrective actions the user can perform to modify their circuit design to avoid the conflicts limiting the performance of their design, among other things. Further, some embodiments may compute expected performance improvements that could be achieved if the initial condition conflicts are addressed and display the expected performance via the GUI. It should be appreciated that the embodiments of the present disclosure may be implemented as instructions executed in a processor and/or hardware logic (e.g., an application-specific integrated circuit (ASIC) or a programmable logic device (PLD) such as a field programmable gate array (FPGA)).

As may be appreciated, the GUI may enable a user to better understand what design changes were performed by the retimer, what initial conditions conflicts arise during retiming, and what changes are recommended to achieve a certain level of clock signal performance. This may be beneficial early in the development lifecycle of a circuit design by determining what the performance estimates are of a particular circuit design. Also, the techniques may be beneficial in a late design stage where the user has made some circuit design changes and initial conditions conflicts arise but the user is looking to get a last desired performance improvement. For example, the techniques may provide guidance on the circuit design changes to make to achieve the desired performance improvement.

With the foregoing in mind, FIG. 1 illustrates a block diagram of a system 10 that utilizes a circuit design component 12 that determines variations of a first circuit design 14 and uses a graphical user interface (GUI) 16 to display the variations, any associated conflicts, and/or recommendations to address the conflicts to program an integrated circuit 18. The circuit design component 12 may represent a CAD optimization tool. The circuit design component 12 may include the first circuit design 14, the GUI 16, and a retimer 20. The first circuit design 14 may represent the user's original circuit design source code written in a low-level programming language. The retimer 20 may accept the first circuit design 14 as input and determine variations including circuit design changes to the first circuit design 14. The retimer 20 may also retime the performance of the first circuit design 14 and the variations (e.g., by allowing certain circuitry of the circuit design to be fed by a higher frequency clock signal).

In some embodiments, the circuit design changes made in the variations of the first circuit design 14 may be made in an attempt to maximize the performance of the clock signals feeding the first circuit design 14. It should be understood that performance of the clock signals refers to the frequency of the clock signals, since the frequency of a clock signal that drives some circuitry of the circuit design 14 may be limited by the design of the circuitry driven by that clock signal. The circuit design changes made in the variations of the first circuit design 14 to enhance performance of the variations being fed the clock signals may include removing asynchronous clears, converting asynchronous clears to synchronous clears, removing user directives, adding pipelining (adding registers on either side of an asynchronous clock transfer), and the like. It should be noted, that in many cases there may be multiple options for improving the performance and there may be tradeoffs between a desired level of performance with an amount of effort required to achieve the desired level of performance.

The GUI 16 may facilitate displaying the options to the user including the variations, any associated initial conditions conflicts, any source registers involved in the initial conditions conflicts, recommendations to address the conflicts, and/or expected performance improvements resulting from implementing the recommendations. As illustrated, the GUI 16 may display a first circuit design performance 22 and some number N variations (e.g., a circuit design variation 1 24, a circuit design variation 2 26, and/or a circuit design variation N 28). The information displayed by the GUI 16 may be altered and presented in any suitable format. For example, the GUI 16 may present the information in a summary of the achievable performance by each clock signal domain (e.g., write, read, set host) and type of variation used to achieve that performance. Further, the user can drill down into the details of each clock signal domain to compare the first circuit design performance with the variations' performance and the level of effort involved (e.g., number of circuit design changes to address initial condition conflicts) to achieve their performance.

Further, the GUI 16 may enable a user to select a particular circuit design 30 to be compiled by a compiler 32 and implemented by the IC 18. For example, the IC 18 may receive one or more kernel programs which describe the hardware implementations that should be stored in the IC 18. In addition, the GUI 16 may provide a facility to allow the user to guide the compiler 32 and retimer 20 by indicating which circuit design changes (e.g., set values of source registers to "don't care") the user either intends to make or intends not to make (e.g., intends never to make). The compiler 32 can optimize based on the circuit design changes the user intends to make, and the retimer 20 may avoid circuit design changes that the user has indicated they will never make when subsequently retiming.

Figure 2:
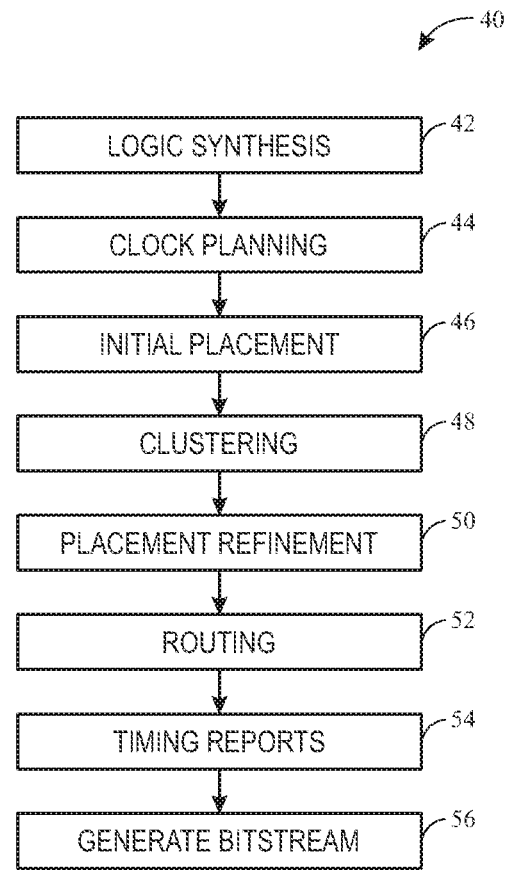
FIG. 2 illustrates a flow diagram of a process suitable for generating a bitstream representative of a register-transfer level (RTL) description where retiming may be performed at each step of the process, in accordance with an embodiment.

Retiming may be performed by the retimer 20 during numerous stages of circuit design. For example, FIG. 2 illustrates a flow diagram of a process 40 suitable for generating a bitstream representative of a register-transfer level (RTL) description where retiming may be performed at each step of the process 40, in accordance with an embodiment. The process 40 may be executed by the circuit design component 12 and may include logic synthesis (block 42), clock planning (block 44), initial placement (block 46), clustering (block 48), placement refinement (block 50), routing (block 52), timing reports (block 54), and generating a bitstream (block 56). Retiming may be performed at any step (blocks 42, 44, 46, 48, 50, 52, 54, and/or 56) to improve the performance of the clock signal fed to the circuit design.

Logic synthesis (block 42) may include creating look-up tables (LUTs), gates, registers (e.g., flip-flops), and the like based on the RTL description provided by the user. As may be appreciated, RTL description is used in hardware description languages like Verilog and Very High Speed Integrated Circuit (VHSIC) Hardware Description Language (VHDL) to create high level representations of a circuit. The RTL description may model the flow of a signal between registers and combinational elements (e.g., logical operators, such as LUTs and/or gates) in a circuit design. Thus, provided with the RTL description, the circuit design component 12 may generate the registers and/or combinational elements included in the circuit design.

Clock planning (block 44) may include allocating clocks to the circuit design. In some instances there may be different clock signal domains that are allocable to the circuit design. For example, one clock signal domain may be named "clk_r" for clock read, another clock signal domain may be named "clk_w" for clock write, and so forth. Initial placement (block 46) may be performed by the circuit design component 12 to place allocated resources, such as the registers, combinational elements, clocks, and the like on a device (e.g., FPGA). Clustering (block 48) may be performed by the circuit design component 12 to group certain resources together based on certain factors, such as physical or functional relationship to one another, power consumption, delay, performance, or the like.

Further, placement refinement (block 50) may be performed by the circuit design component 12 after clustering is completed to refine overall organization and interaction of the resources. Also, the circuit design component 12 may perform routing (block 52) to route the one or more clock signals between the various registers and combinational elements to perform the desired functionality of the circuit design. The circuit design component 12 may also perform timing reports (block 54), which may be displayed by the GUI 16. The timing reports may include the performance of the various clock signals of the first circuit design 14 and/or the variations 22, 24, 26, and/or 28. In some embodiments, the timing reports 54 may include the expected performance of the circuit designs if any present initial conditions conflicts are addressed. Additionally, the circuit design component 12 may generate a bitstream (block 56) to be compiled by the compiler 32. The retimer 20 may perform retiming during any of the steps in the process 40 to improve performance of the clock signals being fed to the circuit design.

Figure 3:
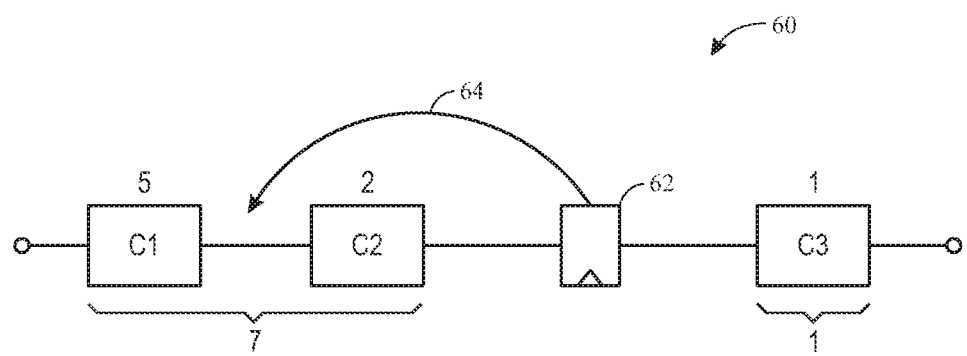
FIG. 3 illustrates an initial circuit design where the critical path has a delay of 7, in accordance with an embodiment.
Figure 4:
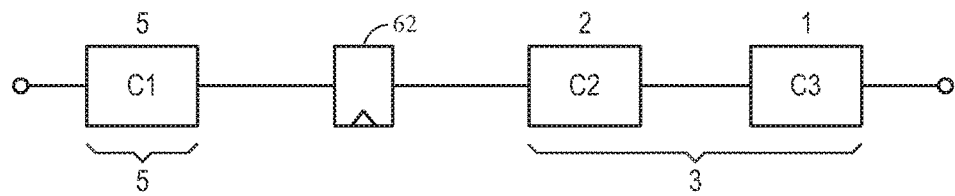
FIG. 4 illustrates a variation to the initial circuit design of FIG. 3 where a register is shifted that results in the critical path producing a delay of 5 after retiming, in accordance with an embodiment.

As discussed above, retiming may reduce the critical path—a logical path of the circuit design with the longest delay—by balancing the likely delays between the various paths of the circuit design. To that end, FIGS. 3 and 4 illustrate a simple example of retiming. In particular, FIG. 3 illustrates an initial circuit design 60 where a critical path with a delay of some value (e.g., 7 units of time), and FIG. 4 illustrates a variation to the initial circuit design of FIG. 3 where a register is moved that results in the critical path producing a delay of some lesser value (e.g., 5 units of time) after retiming.

As illustrated in FIG. 3, the critical path includes a first combinational element C1 that has a delay of 5 units of time and a second combination element C2 that has a delay of 2 units of time, which results in a total delay of 7 units of time. Another path includes just a third combinational element C3 with a delay of 1 unit of time. Thus, the retimer 20 may move register 62 backwards behind the second combinational element C2, as represented by arrow 64, to attempt to balance the delays between the paths. Once the register is repositioned between the first combinational element C1 and the second combinational element C2, as shown in FIG. 4, the critical path delay is reduced to 5, which is produced by just the first combinational element C1, and a new path that includes the second combinational element C2 (delay of 2) and the third combinational element C3 (delay of 1) produces a combined delay of 3. As may be appreciated, registers may be moved forwards or backwards in an attempt to balance the delay between all pairs of registers in a circuit design, thus reducing the maximum delay and hence the cycle time. When registers are moved across nodes with multiple fan-ins or fan-outs, the same move is made across all branches of the fan-in or fan-out to preserve functionality of the circuit.

Figure 5:
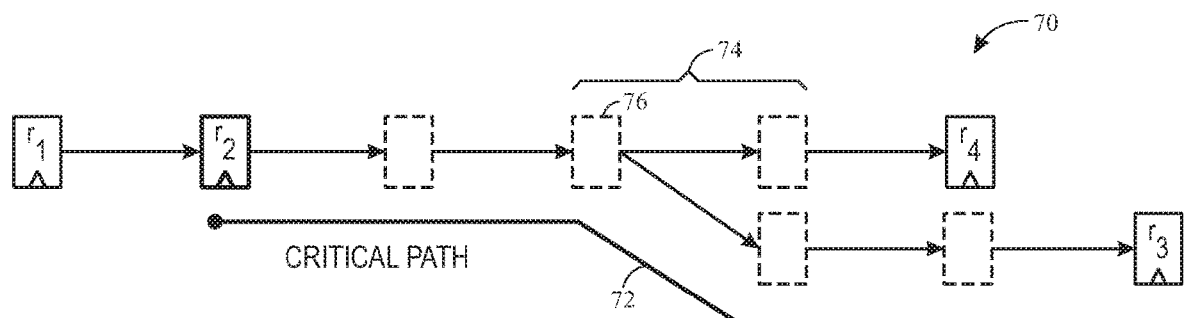
FIG. 5 illustrates an initial circuit design including a critical path with a fan-out of nodes, in accordance with an embodiment.
Figure 6:
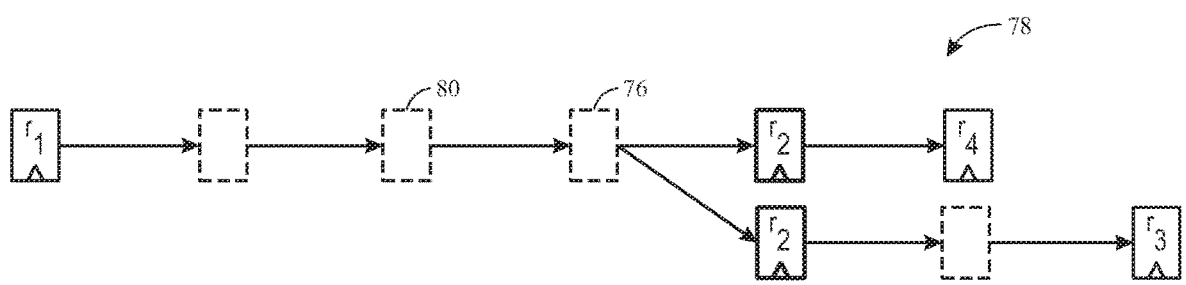
FIG. 6 illustrates a variation to the initial circuit design of FIG. 5 where the critical path is reduced by moving a register forward past various combinational nodes and duplicating the register along both paths of the fan-out, in accordance with an embodiment.

For example, FIGS. 5 and 6 illustrate an example of duplicating a register move across all branches of a fan-out. In particular, FIG. 5 illustrates an initial circuit design 70 including a critical path (line 72) from register $r_2$ to register $r_3$ that is limiting performance. The initial circuit design 70 includes a fan-out 74 where two paths fan-out from a single node 78 (e.g., combinational element, LUT, etc.). The retimer 20 may determine that moving register $r_2$ forward three positions past various combinational nodes may eliminate this critical path and balance the delay between all pairs of registers in the circuit design. However, because there is a fan-out (e.g., branch point) included in the initial circuit design 70, the move needs to be duplicated along both paths.

Accordingly, FIG. 6 illustrates a variation 78 to the initial circuit design 70 of FIG. 5 where the critical path is eliminated by moving register $r_2$ forward past nodes 76 and 80 and duplicating the register $r_2$ along both paths of the fan-out 76. As noted above, $r_2$ is duplicated to ensure the functional equivalence of the circuit is maintained by preserving initial conditions after the register is moved.

In addition, the retimer 20 may move registers backwards across combinational elements to attempt to improve the performance of the clock signal feeding the circuit design. Backward retiming moves may include merging two or more registers into a single register (e.g., when the two or more registers are on respective branches and need to be merged into a single branch in a fan-in). However, in some instances, backwards retiming moves may fail when attempting to maintain the functional equivalence of an initial circuit design due to initial condition conflicts.

Figure 7:
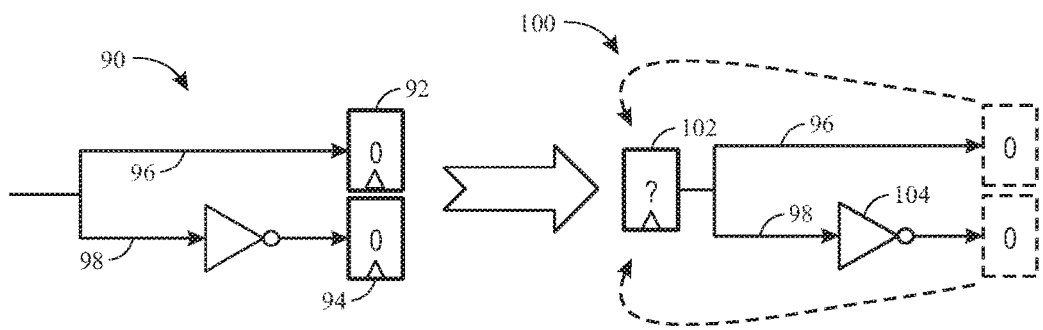
FIG. 7 illustrates an initial circuit design where backward retiming fails due to an initial conditions conflict, in accordance with an embodiment.

For example, FIG. 7 illustrates a portion of an initial circuit design 90 where backward retiming fails due to an initial conditions conflict. As illustrated, the initial circuit design 90 includes a first register 92 and a second register 94 that are each part of a respective branch 96 and 98 in the circuit design 90. The first register 92 and second register 94 have initial power-up states of 0. The retimer 20 may attempt to move the registers 90 and 92 backward during retiming to balance delays of the various paths in the circuit design 90.

In doing so, the retimer 20 may generate a varied circuit design 100 by merging the two registers 92 and 94 into a third register 102 and attempting to compute the new power-up state of the third register 100 to maintain functional equivalence of the initial conditions of the varied circuit design 102 with the initial circuit design 90 (e.g., initial output state of 0's from registers 92 and 94). However, branch 98 includes an inverter 104, and therefore, it is not possible to compute an initial power-state for the third register 102 that will result in the same initial conditions of registers 92 and 94 of 0. To illustrate, setting the power-up state to 0 in the third register 102 results in the branch 96 outputting a 0, which is the initial condition for the first register 92, and would be acceptable, but the power-up state of 0 for the third register 102 would be negated by the inverter 104 and the second branch 98 would output a 1, which conflicts with the initial condition for the second register 94 of 0. Further, setting the power-up state to 1 in the third register 102 results in the branch 96 outputting a 1, which conflicts with the initial condition for the second register 92 of 0. Accordingly, the retiming move fails because both power-up states of 0 and 1 in the third register 102 result in an initial conditions conflict (e.g., neither power-up state of 0 or 1 for the third register 102 result in 0 for both outputs of the first and second branch 96 and 98) that renders the varied circuit design 100 functionally unequal to the initial circuit design 90.

Figure 8:
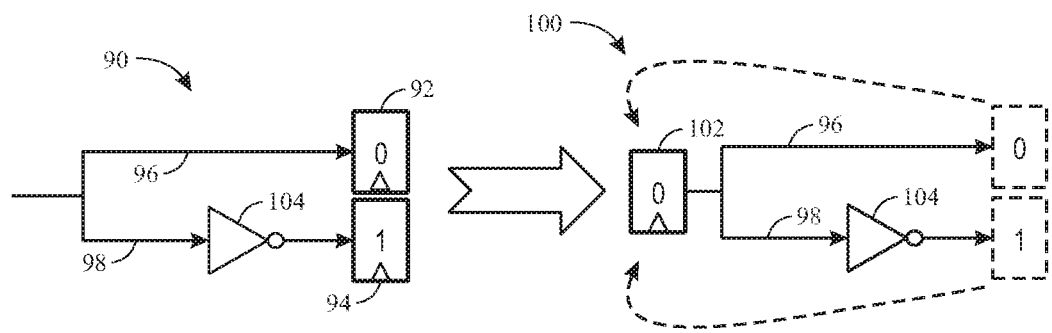
FIG. 8 illustrates the initial circuit design of FIG. 7 where a user has changed the power-up state for one of the registers to enable backwards retiming.

In some instances, a user may intervene to change the initial power-up state of the first and second registers 92 and 94 in the initial circuit design 90 to enable the backwards retiming move described above. For example, FIG. 8 illustrates the initial circuit design 90 of FIG. 7 where a user has changed the power-up state for the second register 94 to 1 to enable the backwards retiming move. As depicted, the retimer 20 is able to merge registers 92 and 94 into the third register 102 and move the third register 102 backwards, while still computing the power-up state without encountering an initial condition conflict in the varied circuit design 102. In particular, setting the power-up state of the third register 102 to 0 results in the first branch 96 outputting a 0, which preserves the initial condition of the first register 92, and results in the second branch 98 outputting a 1 (due to the inverter negating the 0), which preservers the modified initial condition of the second register 94.

Figure 9:
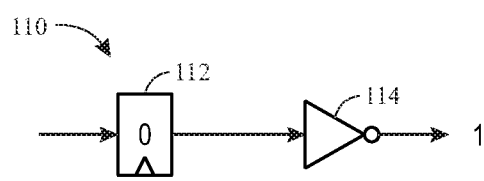
FIG. 9 illustrates an initial circuit design with an initial output state of 1.
Figure 10:
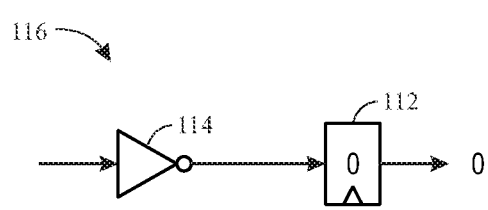
FIG. 10 illustrates a variation of the initial circuit design of FIG. 9 where a register is moved past an inverter and the output state is changed to 0.
Figure 11:
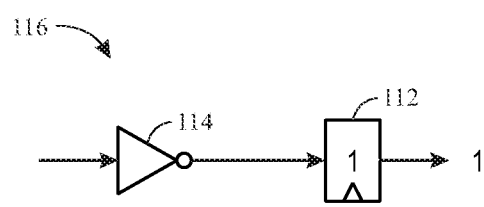
FIG. 11 illustrates the circuit design variation of FIG. 10 where the initial state of the register is changed to 1 to preserve the initial condition of the initial output state of 1 from the initial circuit design of FIG. 9.

FIGS. 9-11 show an example of preserving initial conditions by moving a register forward past a combinational element by modifying the power-up state of the register. In particular, FIG. 9 illustrates an initial circuit design 110 with an initial output state of 1. As illustrated, the initial circuit design 110 includes a register 112 with an initial value of 0 followed by an inverter 114, thereby resulting in the initial output state of 1. FIG. 10 illustrates a variation 116 of the initial circuit design 110 of FIG. 9 where the register 112 is moved forward past the inverter 114 and the initial output state changes to 0. Thus, the forward retiming move fails because the initial conditions (e.g., initial output state of 0) of the varied circuit design 116 conflict with the initial conditions (e.g., initial output state of 1) of the initial circuit design 110. To remove the initial conditions conflict, the user may change the initial power-up state of the register 112 to 1 so that the overall initial output state of the varied circuit design 116 is 1, as shown in FIG. 11.

Figure 12:
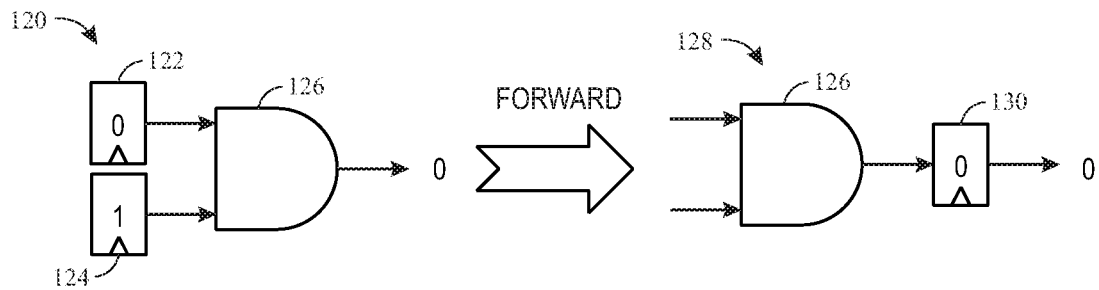
FIG. 12 illustrates an example of preserving initial conditions by moving registers forward during retiming.
Figure 13:
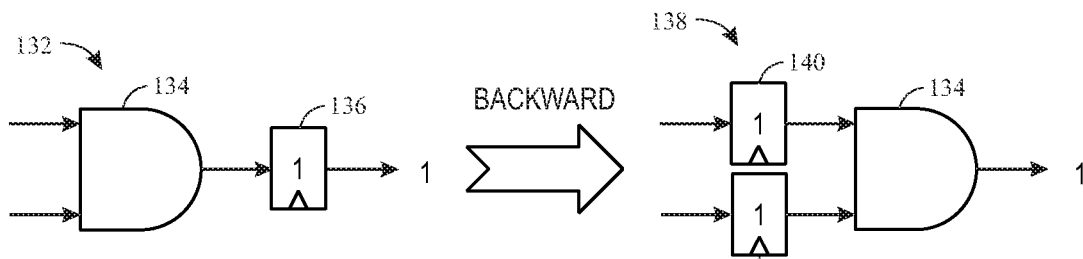
FIG. 13 illustrates an example of preserving initial conditions when moving a register backwards during retiming.

FIGS. 12 and 13 illustrate additional initial conditions preservation examples. In particular, FIG. 12 illustrates an example of preserving initial conditions by moving registers forward during retiming, and FIG. 13 illustrates an example of preserving initial conditions when moving a register backwards during retiming.

Regarding FIG. 12, an initial circuit design 120 is illustrated that includes a first register 122 and a second register 124 that provide input to an AND gate 126. The power-up state of the first register 122 is set to 0 and the power-up state of the second register 124 is set to 1, so the AND gate 126 outputs an initial output state of 0 for the initial circuit design 120. During retiming, the retimer 20 generates a varied circuit design 128 by moving the first and second registers 122 and 124 forward past the AND gate 126 and merging the registers 122 and 124 into a third register 130. The retimer 20 calculates the power-up state of the third register 130 to be 0 so the initial output state of the varied circuit design 128 preserves the initial output state of the initial circuit design 120, and there is no initial conditions conflict.

Regarding FIG. 13, an initial circuit design 132 is illustrated that includes an AND gate 134 that outputs data to a first register 136. The power-up state of the first register 136 is set to 1, so the initial output state of the initial circuit design 132 is 1. During retiming, the retimer 20 generates a varied circuit design 138 by moving the first register 138 backwards past the AND gate 134 and duplicating the first register 134 into a second register 140 and a third register 142. The retimer 20 calculates the power-up states of the second and third registers 140 and 142 to be 1 so the AND gate 134 outputs a 1, thereby preserving the initial output state of the initial circuit design 132 (no initial conditions conflict).

However, as previously discussed with regard to FIG. 7, there may be scenarios where the retimer 20 cannot determine an initial value for the register after a retiming move that will preserve the initial output state of the circuit. In some instances, the registers may just exist in an intermediate netlist created during retiming and not a pre-retiming netlist. A netlist may refer to the connectivity of a circuit design. The "net" may refer to the data paths that are connected to form the circuit. The netlist may list the data paths, including timing information for each data path (e.g., delay data) and the registers involved with each data path, instances, and so forth. When the register just exists in the intermediate netlist, a user may not be able to change the initial power-up state of the register that is involved in the failed retiming move. As discussed in more detail below, to address this issue, some embodiments of the present disclosure may identify the source register in the pre-retiming netlist involved in the initial conditions conflict and modify the values to "don't care."

Figure 14:
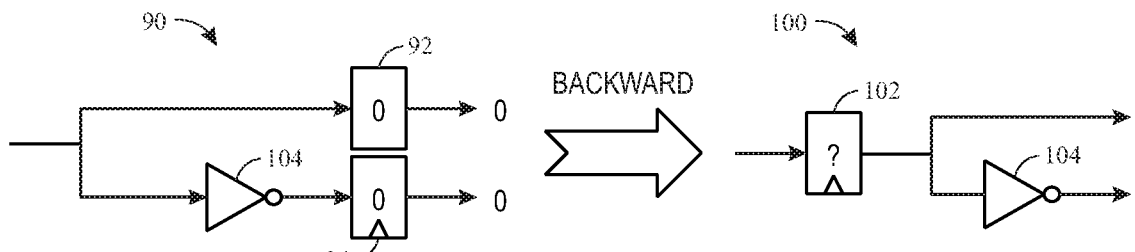
FIG. 14 illustrates an example of a circuit design where the initial condition of the circuit cannot be preserved when moving the registers backward during retiming, in accordance with an embodiment.
Figure 15:
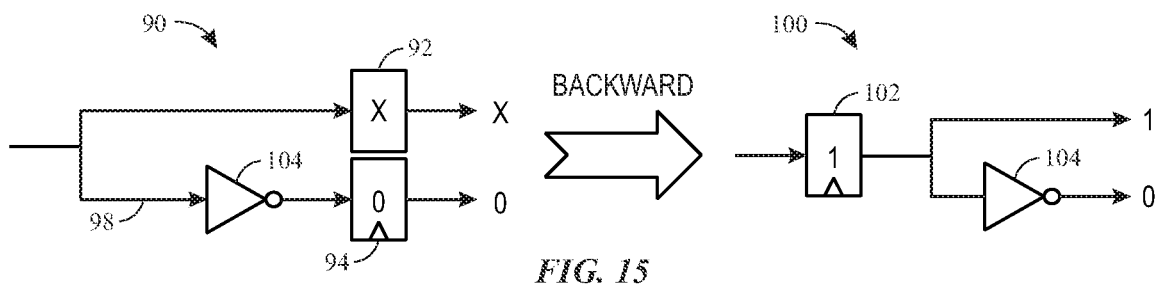
FIG. 15 illustrates a first example of assigning a "don't care" power state to a first register in the circuit design of FIG. 14 to enable retiming backward, in accordance with an embodiment.
Figure 16:
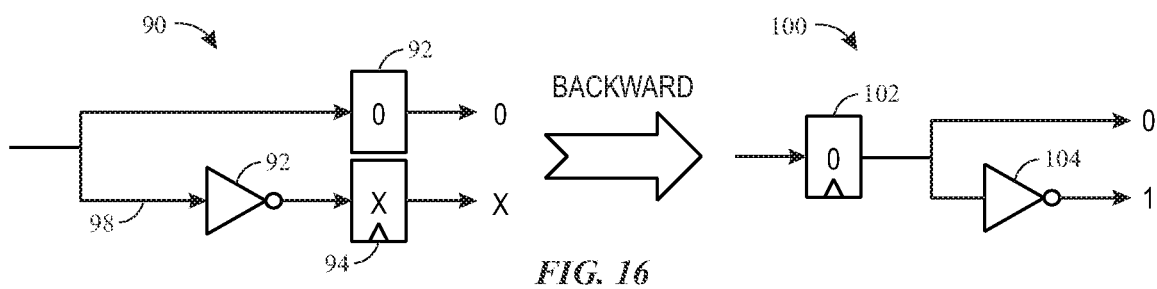
FIG. 16 illustrates a second example of assigning a "don't care" power state to a second register in the circuit design of FIG. 14 to enable retiming backward, in accordance with an embodiment.

For example, FIG. 14 redisplays the example from FIG. 7 where a backwards retiming move of two registers 92 and 94 fails due to an initial condition conflicts. Instead of changing the power-up state of the registers 92 and 94 to a 1 or 0, some embodiments of the present disclosure may identify the first and second register 92 and 94 as source registers that are involved in an initial condition conflict and set the power-up state value of at least one of the registers 92 and 94 to "don't care" (X), as shown in FIGS. 15 and 16. In particular, FIG. 15 illustrates an example of assigning a "don't care" power-up state to the first register 92 in the initial circuit design 90 of FIG. 14 to enable backward retiming, and FIG. 16 illustrates an example of assigning a "don't care" power-up state to the second register 94 in the initial circuit design 90 of FIG. 14 to enable backward retiming, in accordance with an embodiment. As referred to herein, a "don't care" value may be set to either a logical 0 or a logical 1.

Regarding the example illustrated in FIG. 15, the initial output state of the initial circuit design 90 is a "don't care" (e.g., 0 or 1) from the first branch 96 and a 0 from the second branch 98. Accordingly, when the retimer 20 moves the first and second registers 92 and 94 and merges them into the third register 102 in the varied circuit design 100, the retimer 20 may calculate a power-up state for the third register to be a 1 to preserve the initial output state of 1 ("don't care" value allows either 0 or 1 to be correct) from the first branch 96 and 0 (the inverter 104 negates the 1 from the third register 102) from the second branch 98. Accordingly, setting the first register 92 to "don't care" enables the backward retiming move, which may improve performance of the circuit.

Additionally, regarding the example illustrated in FIG. 16, the initial output state of the initial circuit design 90 is a 0 from the first branch 96 and a "don't care" (e.g., 0 or 1) from the second branch 98. Accordingly, when the retimer 20 moves the first and second registers 92 and 94 and merges them into the third register 102 in the varied circuit design 100, the retimer 20 may calculate a power-up state for the third register to be a 0 to preserve the initial output state of 0 from the first branch 96 and 1 (the inverter 104 negates the 0 from the third register 102 and the "don't care" value allows either 0 or 1 to be correct) from the second branch 98. Accordingly, setting the second register 94 to "don't care" also enables the backward retiming move, which may improve performance of the circuit.

Figure 17:
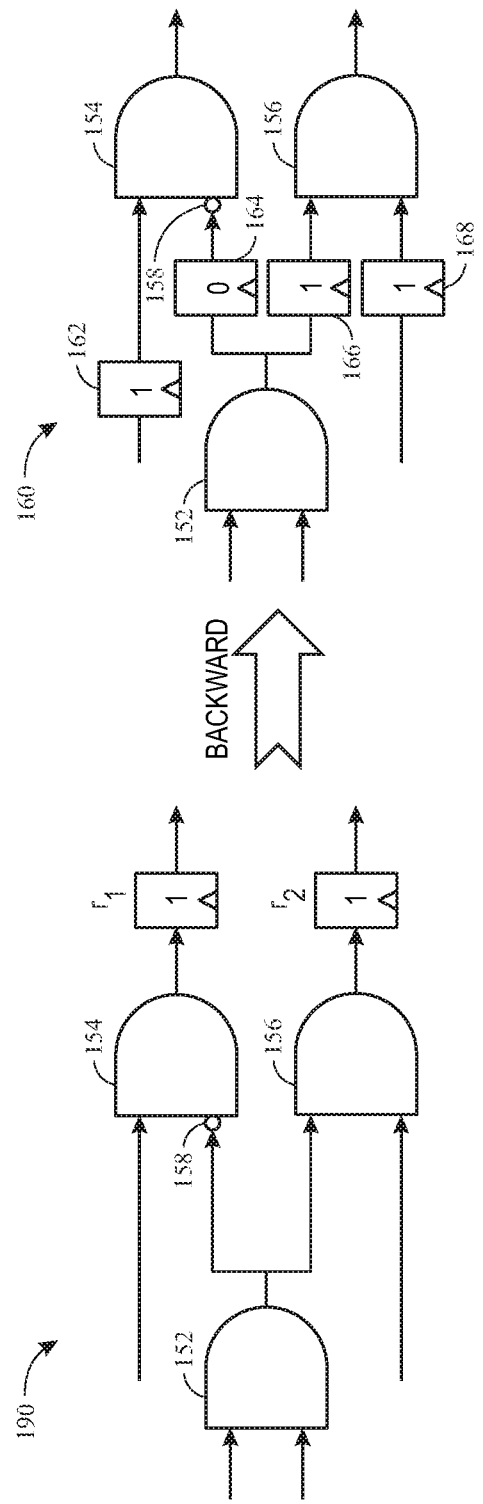
FIG. 17 illustrates an example of incremental backwards retiming moves that fail due to an initial conditions conflict, in accordance with an embodiment.

FIG. 17 illustrates an example of incremental backwards retiming moves that fail due to an initial conditions conflict, in accordance with an embodiment. As illustrated, the initial circuit design 150 includes a first AND gate 152, a second AND gate 154, and a third AND gate 156. The first AND gate 152 receives two inputs and outputs one value to an input of the second AND gate 154 and the third AND gate 156. The input to the second AND gate 154 includes an inverter 158. The second and third AND gates 154 and 156 also include second input lines. The second AND gate 154 outputs data to a first register $r_1$, which has a power-up state of 1, and the third AND gate 156 outputs data to the second register $r_2$, which has a power-up state of 1. Thus, the initial output state from register $r_1$ is 1 and the initial output state from register $r_2$ is 1.

During retiming, the retimer 120 may generate a varied circuit design 160 (e.g., intermediate netlist) by moving registers $r_1$ and $r_2$ backwards past the second and third AND gates 154 and 156, respectively. Because the retimer 20 attempts to ensure functional equivalence, the registers $r_1$ and $r_2$ are duplicated across both branches of the fan-out, as shown in the varied circuit design 164. More specifically, register $r_1$ is duplicated into registers 162 and 164 on the data input lines to the second AND gate 154, and register $r_2$ is duplicated into registers 166 and 168 on the data input lines to the third AND gate 156. In doing so, the retimer 20 may compute the initial power-up state for the register 162 to be 1 and the initial power-up state of the register 162 to be 0 because the inverter 158 negates the 0, thereby enabling the second AND gate 154 to preserve the initial output state of 1. Also, the retimer 20 may compute the initial power-up state for the registers 166 and 168 to be 1 to enable the third AND gate 156 to preserve the initial output state of 1.

However, the retimer 20 may also attempt to retime incrementally through the first AND gate 152 by merging the registers 164 and 166. As discussed above, the computed power-up states for the registers 164 and 166 are 0 and 1, respectively. Therefore, the retiming moves fail because the retimer 20 cannot merge two registers 164 and 166 with different power-up states. As a result, in some embodiments, the GUI 16 may report (e.g., display) the source registers $r_1$ and $r_2$ to be the source of this failing retiming move. The registers 162, 164, 166, and 168 in the varied circuit design 160 may not be assigned names (e.g., like registers $r_1$ and $r_2$) since they are temporary registers created in the intermediate retiming netlist and the registers may not be directly cross-referenced to the original RTL.

In some embodiments, for every register (or intermediate register) created during each retiming step, the retimer 20 may keep track of a set of source registers that are involved in the retiming step. When there is a retiming move that is unsuccessful, the set of source registers may be reported by the GUI 16. In addition to displaying the source registers involved in the initial conditions conflicts, the GUI 16 may display recommended corrective actions for the source registers, such as changing their initial power-up states to "don't care" values and/or enabling individual registers to be agnostic to any power-up state. For example, one or both of the source registers $r_1$ and $r_2$ in the initial circuit design 150 may be set to "don't care" to resolve the initial conditions conflict. Additionally, in some embodiments, modifying a circuit design to implement a reset strategy that enables individual registers to be agnostic to any power-up state may enable retiming without initial state conflicts, and may be a pre-requisite for setting a register to "don't care."

FIG. 18 illustrates a graphical user interface (GUI) screenshot 170 for recommended actions to overcome identified initial condition conflicts during retiming, in accordance with an embodiment. As depicted in the screenshot 170, the GUI 16 recommends changing the power-up state to "don't care" for 197 registers and also lists the identity of the specific source registers to change. Changing the source registers to "don't care" may enable additional retiming to be performed, which may lead to further performance improvements of the clock signal being fed to the circuit design.

FIG. 19 illustrates a flow diagram of a process 180 suitable for recommending corrective actions for source registers involved in a failed retiming move and determining a performance improvement associated with implementing the recommendations, in accordance with an embodiment. The process 180 may be implemented as instructions stored on a tangible, non-transitory machine readable medium and executable by one or more processors. In some embodiments, the process 180 may be executed by the circuit design component 12. Additionally, although the following process 180 describes a number of operations that may be performed, it should be noted that the process 180 may be performed in a variety of suitable orders and all of the operations may not be performed.

The process 180 may include receiving (block 182) a first circuit design 14 (e.g., from a user) and performing (block 184) retiming on the first circuit design 14 using the retimer 20. As discussed above, retiming may reposition registers across combinational elements in the first circuit design to generate one or more variations to the first circuit design in an effort to improve performance of a clock signal being fed to the circuit design. The process 182 may identify (block 186) source registers where retiming moves are unsuccessful by displaying the source registers via the GUI 16. For example, backwards retiming moves may fail due to initial conditions conflicts.

Further, the process 180 may recommend (block 188) corrective actions for the user to take to increase performance of the circuit design. In some embodiments, the corrective action may include changing (block 190) the source registers power-up states to "don't care" values. The recommendations may be displayed to the user via the GUI 16. Also, the process 180 may include determining (block 192) an increase in performance if the recommended corrective actions are implemented. Also, in some embodiments, the process 180 may include implementing (block 194) the recommendations by modifying the RTL of the circuit design and outputting a program file to program the integrated circuit 18.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A computer-implemented method, comprising:
performing retiming using a first circuit design to determine one or more variations to the first circuit design;
identifying one or more source registers that are involved in one or more unsuccessful retiming moves due to initial conditions conflicts, wherein the initial conditions conflicts occur when a retimer unsuccessfully determines power-up states for intermediate registers in the one or more variations to the first circuit design to exhibit functionally equivalent behavior as the first circuit design;
displaying, via a graphical user interface, one or more selectively enablable recommendations indicating at least a portion of the one or more source registers for which one or more corrective actions can be performed;
receiving user input indicative of a selection of at least one of the one or more recommendations; and
generating a second circuit design in which a portion of the one or more corrective actions are performed to the portion of the one or more source registers corresponding to the at least one of the one or more recommendations indicated by the user input.

2. The method of claim 1, comprising calculating a performance improvement for the one or more variations if the one or more corrective actions are implemented.

3. The method of claim 1, wherein the one or more corrective actions to the one or more source registers will avoid the initial conditions conflicts.

4. The method of claim 1, comprising causing the second circuit design to be programmed onto an integrated circuit.

5. The method of claim 4, comprising causing the second circuit design to be programmed onto the integrated circuit by:
   generating a bitstream representative of the second circuit design; and
   providing the bitstream to the integrated circuit to program the integrated circuit.

6. The method of claim 1, wherein the one or more source registers are included in the first circuit design.

7. The method of claim 1, wherein functionally equivalent behavior comprises producing an equivalent output state as the first circuit design.

8. The method of claim 1, wherein the one or more corrective actions comprise changing a value of the one or more source registers to a "don't care" value, configuring the one or more source registers to be power-up state agnostic, or both, wherein the "don't care" value can be set to either a logical 1 or a logical 0.

9. A tangible, non-transitory, computer-readable medium, comprising instructions that, when executed by a processor, are configured to cause the processor to:
   perform retiming using a first circuit design to determine one or more variations to the first circuit design;
   identify one or more source registers that are involved in one or more unsuccessful retiming moves due to initial conditions conflicts, wherein the initial conditions conflicts occur when a retimer unsuccessfully determines power-up states for intermediate registers in the one or more variations to the first circuit design to exhibit functionally equivalent behavior as the first circuit design;
   cause a graphical user interface on an electronic display to display one or more selectively enablable recommendations indicating at least a portion of the one or more source registers for which one or more corrective actions can be performed;
   receive user input indicative of a selection of at least one of the one or more recommendations; and
   generate a second circuit design in which a portion of the one or more corrective actions are performed to the portion of the one or more source registers corresponding to the at least one of the one or more recommendations indicated by the user input.

10. The tangible, non-transitory, computer-readable medium of claim 9, wherein the one or more unsuccessful retiming moves comprise moving the one or more source registers backwards past one or more combinational elements.

11. The tangible, non-transitory, computer-readable medium of claim 9, wherein the instructions, when executed, are configured to cause the processor to cause the second circuit design to be programmed onto an integrated circuit.

12. The tangible, non-transitory, computer-readable medium of claim 9, wherein the one or more corrective actions comprise changing a value of the one or more source registers to a "don't care" value, configuring the one or more source registers to be power-up state agnostic, or both, wherein the "don't care" value can be set to either a logical 1 or a logical 0.

13. The tangible, non-transitory, computer-readable medium of claim 9, wherein the one or more source registers are included in the first circuit design represented by a register-transfer level (RTL) description.

14. The tangible, non-transitory, computer-readable medium of claim 9, wherein the instructions, when executed, are configured to cause the processor to calculate a performance improvement for the one or more variations if the one or more corrective actions are implemented.

15. The tangible, non-transitory, computer-readable medium of claim 14, wherein the instructions, when executed, are configured to cause the processor to cause the graphical user interface to display the performance improvement for the one or more variations.

16. The tangible, non-transitory, computer-readable medium of claim 9, wherein the instructions, when executed, are configured to cause the processor to cause the graphical user interface to display the identified one or more source registers involved in the one or more unsuccessful retiming moves.

17. A circuit design component executed in a processor, comprising:
   a retimer that:
      receives a first circuit design;
      determines a plurality of variations of the first circuit design;
      identifies one or more source registers involved in one or more unsuccessful retiming moves due to initial conditions conflicts, wherein the initial conditions conflicts occur when the retimer unsuccessfully determines power-up states for intermediate registers in the one or more variations to the first circuit design to exhibit functionally equivalent behavior as the first circuit design; and
      determines one or more selectively enablable recommendations indicating at least a portion of the one or more source registers for which one or more corrective actions can be performed; and
   a graphical user interface (GUI) that:
      displays an identity of the one or more source registers involved in the one or more unsuccessful retiming moves and one or more recommendations each comprising at least one of the one or more corrective actions, wherein the one or more recommendations are selectively enablable such that, for each of the one or more recommendations that is selected to be implemented, an associated corrective action of the corrective actions will be implemented to a corresponding source register of the one or more source registers; and
      receives user input indicative of the selected recommendations of the one or more recommendations;
   wherein the retimer is configured to generate a second circuit design in which a portion of the one or more corrective actions are performed to the portion of the one or more source registers based on the user input.

18. The circuit design component of claim 17, configured, via the processor, to cause the second circuit design to be implemented on an integrated circuit.

19. The circuit design component of claim 17, wherein the one or more corrective actions comprise changing a value of the one or more source registers to a value that can be set to either a logical 1 or a logical 0.

20. The circuit design component of claim 17, wherein the retimer calculates a performance improvement for the one or more variations that would likely occur when the one or more corrective actions are implemented.

* * * * *